United States Patent
Kawasaki (10) Patent No.: US 7,286,931 B2
(45) Date of Patent: Oct. 23, 2007

(54) VEHICLE NAVIGATION DEVICE AND METHOD OF DISPLAYING POI INFORMATION USING SAME

(75) Inventor: Shingo Kawasaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/354,900

(22) Filed: Jan. 30, 2003

(65) Prior Publication Data

US 2003/0167120 A1    Sep. 4, 2003

(30) Foreign Application Priority Data

Feb. 26, 2002    (JP) .............................. 2002-049138

(51) Int. Cl.
*G01C 21/34* (2006.01)
(52) U.S. Cl. ...................... 701/209; 701/200; 701/201; 342/357.09; 342/357.1
(58) Field of Classification Search ............ 701/23–26, 701/200–202, 208–211, 28; 342/357.09, 342/357.1; 340/995.1, 988
See application file for complete search history.

(56) References Cited

U.S. PATENT DOCUMENTS

| | | | |
|---|---|---|---|
| 6,064,941 A * | 5/2000 | Nimura et al. .............. | 701/210 |
| 6,405,129 B1 | 6/2002 | Yokota | |
| 2004/0049336 A1* | 3/2004 | Knockeart et al. .......... | 701/201 |

FOREIGN PATENT DOCUMENTS

| | | |
|---|---|---|
| JP | 09-106246 | 4/1997 |
| JP | 10-055370 | 1/1998 |
| JP | 11-142175 | 5/1999 |
| JP | 11-248477 | 9/1999 |
| JP | 2001-324348 | 11/2001 |

* cited by examiner

*Primary Examiner*—Yonel Beaulieu
(74) *Attorney, Agent, or Firm*—Brinks Hofer Gilson & Lione (57) ABSTRACT

A vehicle navigation device is provided for permitting the display of the current POI (Point of Interest) information about points of interest which serve as landmarks near a guidance route to the destination, thereby improving visibility when a user identifies the guidance route. A vehicle navigation device 50 is connected in communication with a provider 60 for offering transmission service of map information which includes the current POI information pertaining to locations on a map where the points of interest are located. The navigation device 50 includes a display unit 6, information input means 2, communications means 3, and control means 17. The control means 17 accesses the provider 60 through the communications means 3 when the guidance route to the destination is set by the information input means 2, to obtain the current POI information about an area near the set guidance route from the map information, so that the obtained current POI information is displayed on a screen of the display unit 6, together with the guidance route and a vehicle position mark for designating a present position of a vehicle.

17 Claims, 5 Drawing Sheets

VEHICLE NAVIGATION DEVICE AND METHOD OF DISPLAYING POI INFORMATION USING SAME

BACKGROUND OF THE INVENTION

1. Field of the Invention

The present invention relates to a vehicle navigation device that guides a vehicle to a destination according to a guidance route. More particularly, the invention relates to a vehicle navigation device having the function of displaying on a map screen of a display not only the guidance route, but also information indicative of points of interest (hereinafter referred to as "POI") which serve as landmarks near the route.

For convenience, the information indicating the POI will be referred to as the "landmark" below. Unless otherwise specified, the "vehicle" means a car.

2. Description of the Related Art

A known typical vehicle navigation device comprises a map data storage unit for prestoring map data, such as a CD-ROM, a DVD-ROM or an IC memory card, a display unit, a GPS (Global Positioning System) receiver, and a sensor for detecting a present position and a present direction of a vehicle, such as a gyro, a vehicle speed sensor, or the like. The navigation device is designed to read map data for the area including the present vehicle position from the map data storage unit, and then to draw a map image covering the vehicle position and its surroundings on a screen of the display unit based on this map data, while superimposing a vehicle position mark (location) on the map image displayed on the screen. Such a navigation device scrolls the map image as the vehicle travels, or moves the vehicle position mark with the map image fixed on the screen, thereby enabling a user to understand at a glance where the vehicle is now traveling.

Generally, the vehicle navigation device has the function of guiding the user (route guidance function) to a desired destination so that he/she can easily travel to the destination without taking a wrong path. This route guidance function executes an automatic route search for an optimal route (typically, the lowest cost route) connecting a starting point (in most cases, the present vehicle position) to the destination by making a simulation calculation such as a horizontal search method or Dijkstra's algorithm method using the map data, and storing the route searched for or found as a guidance route. During the vehicle travel, the guidance route found is displayed on the map image in a different and distinguishable form (for example, in a different color, or in a thicker line) from the other roads. When the vehicle approaches a predetermined distance to an intersection where the vehicle is to turn on the guidance route, the guidance function displays a guidance view of the intersection superimposed on the map image (which view includes an enlarged diagram of the intersection and an arrow for designating a recommended traveling direction at the intersection), thus enabling the user to recognize the optimal route to the destination.

Particularly, when searching for the route, the navigation device needs the user to preset the destination, or if necessary, a way point to the destination (that is, which route the user desires to pass through to reach the destination). Under certain circumstances, various criteria (for example, whether the user gives a high priority to a toll road or a general road, or whether the user wishes to reduce the traveling distance or the traveling duration) also should be set. Based on this preset data, the navigation device searches for a plurality of possible routes to the destination to display these searched routes, for example in respective different colors, and subsequently conducts the route guidance as mentioned above in compliance with one of these routes selected by the user.

Such known navigation devices display the optimal guidance route determined from a result of the aforesaid route search superimposed on a map screen of the display, while displaying on the map screen the POI information serving as landmarks on the guidance route, such as a convenience store, a bank, a gas station and the like. With the guidance route to the destination shown, the display of the POI information as the landmarks for specifying the guidance route facilitates the user's confirmation of the route during the vehicle travel.

In the prior art, however, the POI information displayed with the guidance route included only fixed contents that had been prestored in a memory of the device or the like. That is, only POI information is displayed that has been included in the map data from the beginning when a disc such as the CD-ROM, the DVD-ROM, or the like was manufactured for storing the map data.

As described above, in the known vehicle navigation devices, the POI information displayed when the route guidance is shown or executed on the map screen of the display has only the fixed or limited contents included in the map data prestored in the CD-ROM and the like. Thus, even if POI information on the points of interest serving as the landmarks displayed on the map screen has been updated by the user's settings, this updated POI information cannot be reflected on the actual map screen.

For instance, suppose that when displaying POI information on the convenience stores located near the guidance route being shown or displayed, the number of the convenience stores increases or decreases, because new ones are opening or because some stores are lost due to bankruptcy or a shift to other business. In these cases, since the POI information capable of being displayed is limited to only the fixed information prestored in the CD-ROM and the like, the navigation device fails to display the current POI information reflecting the increase or decrease in the number of stores on the map screen.

In other words, even when the POI information about the points of interest serving as the landmarks to be displayed has been updated, the updated POI information, namely the updated part of the information, cannot be displayed on the map screen. Therefore, the points or facilities actually existing around the guidance route to the destination do not match the corresponding POI information being displayed on the map screen, which information pertains to the points not updated. This mismatch undesirably makes it difficult for the user (generally, a driver) to identify or recognize the actual or true guidance route by referring to the displayed POI information as landmarks.

As mentioned above, the POI information displayed on the map screen does not necessarily correspond to the actual points of interest. This inaccurate POI information cannot be used with accuracy as landmarks in order for the user or driver to identify the actual or existing guidance route. Additionally, looking at the map image including this incorrect POI information frequently results in interruption of the user's driving

SUMMARY OF THE INVENTION

The present invention has been accomplished in view of the aforesaid technical background, and it is an object of the present invention to provide a vehicle navigation device that permits constant display of the current POI information about points of interest which serve as landmarks near a guidance route leading to the destination, thereby improving visibility when a user wishes to confirm the guidance route.

To solve the foregoing problems encountered with the known art, according to the present invention, there is provided a vehicle navigation device that is adapted to be connected in communication to a provider for offering transmission service of map information which includes the current POI information pertaining to places on a map where points of interest are located. This navigation device comprises a display unit for providing guidance information to a user; information input means for providing an input of information required to search for a destination and a route; communications means for communicating with the provider; and control means operably connected to the display unit, the information input means, and the communications means; wherein, when a guidance route of interest to the destination is set through the information input means, the control means accesses the provider through the communications means to obtain from the map information the current POI information included in the map information about a predetermined area covering a present position of a vehicle, and then the control means displays the obtained current POI information together with the set guidance route and a vehicle position mark for designating the present vehicle position on a screen of the display unit.

As mentioned above, in accordance with the present invention, when the guidance route is set, the vehicle navigation device accesses the provider to obtain from the map information the current POI information included in the map information for the predetermined area covering the present vehicle position (that is, the map information including the current POI information), so that the obtained POI information is displayed with the guidance route and the vehicle position mark on the screen of the display unit. This allows the user to grasp the constantly current POI information about the points of interest existing around the guidance route to the destination, thus resulting in effective use of the POI information. That is, the current or most recent POI information can be used as landmarks on the screen of the display unit while showing the guidance route, thereby facilitating confirmation of the guidance route (and achieving an improvement in visibility).

DETAILED DESCRIPTION OF THE PREFERRED EMBODIMENTS

Hereinafter various preferred embodiments of the present invention will be described in detail with reference to the accompanying drawings.

Figure 1:
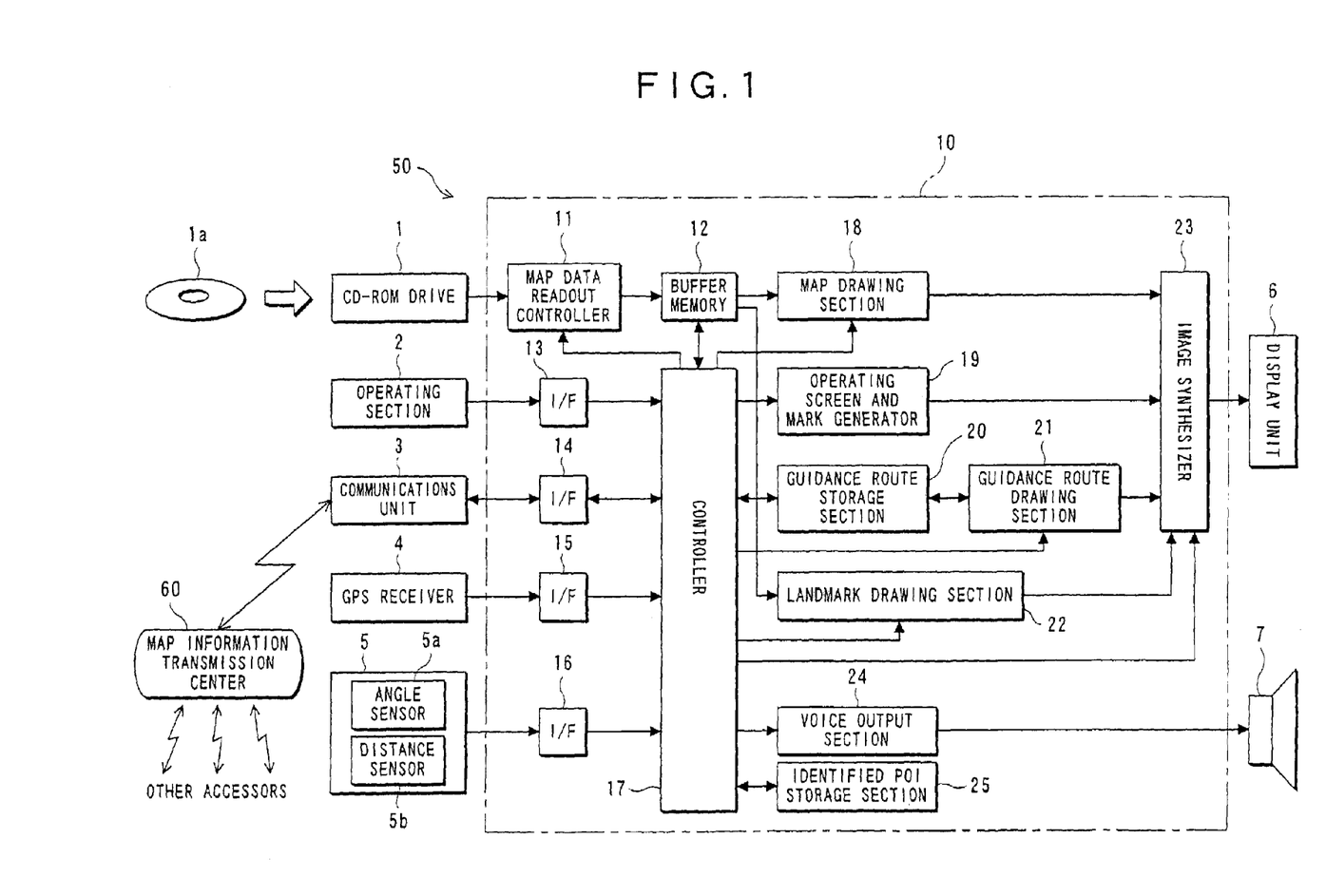
FIG. 1 is a schematic block diagram showing a configuration of a vehicle navigation device of one preferred embodiment according to the present invention.

FIG. 1 shows a schematic block diagram of a configuration of a vehicle navigation device according to one preferred embodiment of the present invention. A vehicle navigation device 50 of the preferred embodiment is connected in communication with a provider (map information transmission center 60) which offers a transmission service of map information so as to transmit and receive information therebetween over the Internet or the like. The map information transmitted from this map information transmission center 60 includes the current POI information concerning locations of points or facilities of interest (a convenience store, a bank, a gas station, and the like) existing near roads.

The vehicle navigation device 50 includes a CD-ROM drive 1, which is operable to drive a CD-ROM 1a that prestores data for navigation (map data and the like). The map stored in the CD-ROM 1a is divided into appropriate longitudinal and latitudinal widths responsive to a reduced scale (for example, $1/12500$, $1/25000$, $1/50000$, $1/100000$, and so on). The roads (road data for display) and the various points of interest (data on the points of interest), both of which are included in the map, are stored in a form consisting of coordinates of dots (nodes) each of which is designated by the longitude and latitude thereof. This CD-ROM 1a stores, in addition to the aforesaid map data including the road data for display, other road data for performing route search as necessary for the navigation.

Figure 2:
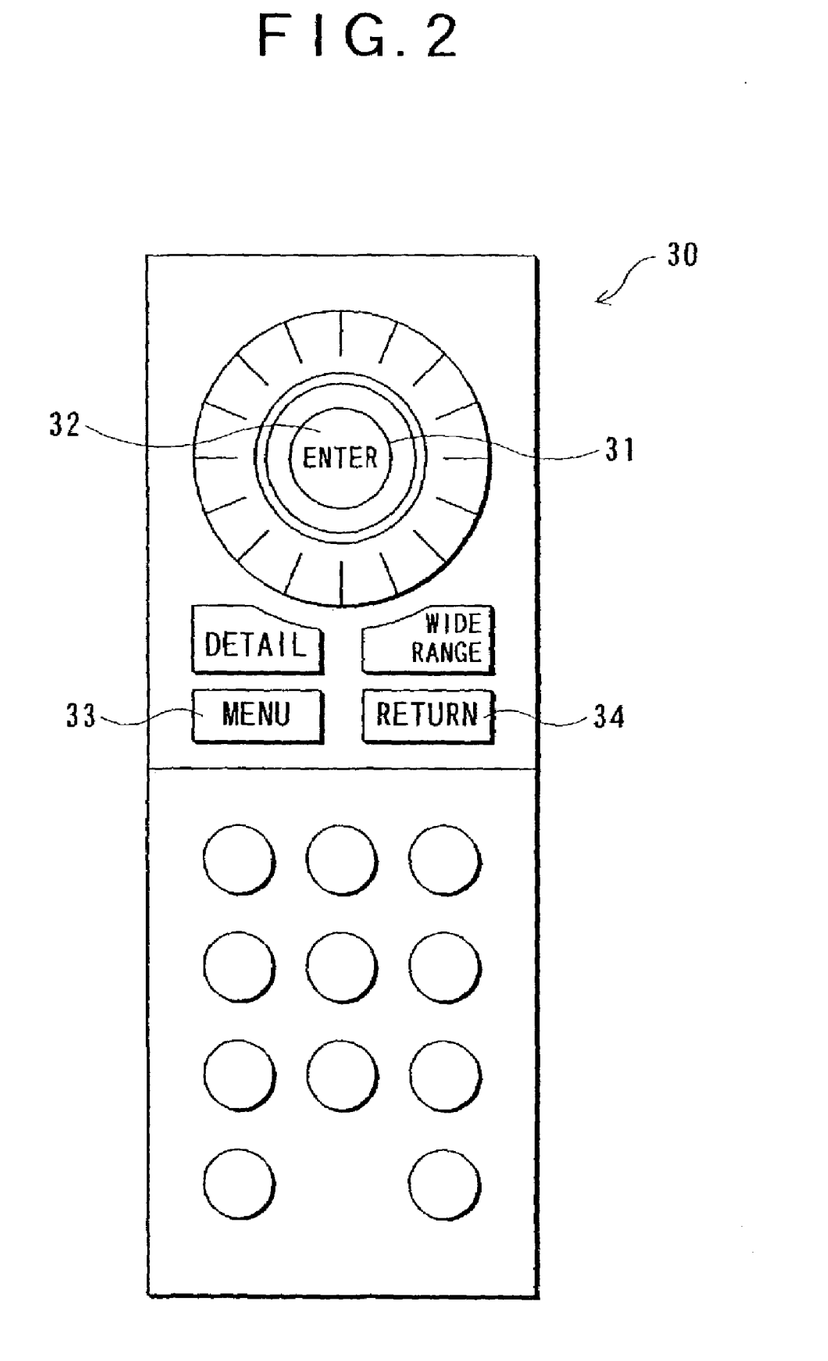
FIG. 2 illustrates an outward appearance of a remote control transmitter which constitutes an operating section in the device of FIG. 1.

An operating section 2 is used to operate a navigation device 10 (which is enclosed by a single-dotted line) as described later. Specifically, the operating section 2 has a remote control transmitter 30 as shown by example in FIG. 2. This remote control transmitter 30 includes various kinds of operating buttons, such as a joy stick 31, an "enter" button 32, a "menu" button 33, a "return" button 34, and the like. The joy stick 31 and the "enter" button 32 are integrally formed, so that when being pushed down in the longitudinal or horizontal direction, the joy stick 31 fulfills its function of selecting desired one or ones from menus and/or items displayed on a screen, while, when being pushed, the "enter" button 32 fulfills its function of executing the selected menu and the like. By a user's operation of these operating buttons, information necessary to search for a destination and a guidance route for the navigation is entered into the navigation device.

A communications unit 3 is, for example a vehicle-mounted phone, and is used to communicate with the map information transmission center 60. A GPS receiver 4 receives GPS signals transmitted from a GPS satellite to detect the longitude and latitude of the present position of a vehicle. A self-contained navigation sensor 5 includes an angle sensor 5a, such as a gyro, for detecting the direction of the vehicle and a distance sensor 5b for generating pulses at established traveling intervals.

A liquid crystal display unit 6 and a speaker 7 also are provided. The display unit 6 is used to provide the user with guidance information about the navigation under control of the navigation device 10 (in detail, the information pertaining to a map covering the present vehicle position and its surroundings, a guidance route from a starting point to a destination, the present vehicle position (namely, a vehicle position mark), and other guidance information) on its screen. Additionally, the display unit 6 is used to display on the screen information about the processes of obtaining and displaying the current POI information, which are carried out by the vehicle navigation device 50 as mentioned later. The speaker 7 is operable to provide the user with the above-mentioned guidance information and information on the POI-information obtaining and displaying processes, by voice.

The navigation device 10 includes a map data readout controller 11 for reading the map data from the CD-ROM 1a, a buffer memory 12 for temporally storing the map data read by the map data readout controller 11, and interfaces (I/F) 13, 14, 15 and 16 connected to the operating section 2, the communications unit 3, the GPS receiver 4, and the self-contained sensor 5, respectively. The device 10 also includes a controller 17 composed of a microcomputer or the like. The controller 17 stores therein programs for navigation (for example, programs for executing route search processing described later and for performing display-output control which is necessary to perform route guidance based on the route search processing). According to these programs, the controller 17 executes various processing for the navigation: detects the present vehicle position based on signals supplied from the GPS receiver 4 and the self-contained navigation sensor 5; controls the map data readout controller 11 to read the map data to be displayed from the CD-ROM 1a into the buffer memory 12; and searches for the guidance route from the starting point (the present vehicle position) to the destination under a preset route-search condition utilizing the map data read out by the buffer memory 12. Also, the controller 17 has the function of controlling the processes of obtaining and displaying the current POI information, which are performed by the vehicle navigation device 50, as mentioned later.

The navigation device 10 further includes a map drawing section 18 for performing drawing processing of a map image using the map data read out by the buffer memory 12, an operating screen and mark generator 19 for generating various menu screens (operating screens) and various kinds of marks such as the vehicle position mark, a cursor or the like, depending on operation conditions, and a guidance route storage section 20 for storing data on the guidance route. In this guidance route storage section 20 is stored the data about all nodes (the coordinates of the dots designated by their longitude and latitude) corresponding to the guidance route, from the starting point to the destination, which has been searched for or found by the controller 17. Moreover, a guidance route drawing section 21 is provided for and has the functions of reading the data (series of nodes) on the guidance route from the guidance route storage section 20, and drawing this guidance route in a different form (for example, in a different color, or in a thicker line) from the other roads.

A landmark (POI information) drawing section 22 has a function of drawing landmarks (POI information) that designate the locations of the individual points of interest responsive to the points data included in the map data read out by the buffer memory 12, while drawing the current or most recent POI information obtained from the map information transmission center 60 through the communications unit 3 under the control of the controller 17. An image synthesizer 23 has a function of superimposing the guidance route drawn by the guidance route drawing section 21, the operating screen and vehicle position mark generated by the operating screen and mark generator 19, and the landmarks (POI information) drawn by the landmark drawing section 22 for designating the locations of the points of interest, on the map image drawn by the map drawing section 18 to display all of them on the screen of the display unit 6. When displaying on the screen the current POI information obtained from the map information transmission center 60 together with the guidance route and the vehicle position mark under the control of the controller 17, the image synthesizer 23 displays an updated portion of the current POI information in different form from the other portions not updated, as explained later. That is, the synthesizer 23 serves a function of displaying the updated portion of the POI information in a different color, or in a relatively highlighted form (in other words, in a form distinguishable to the user), for example by blinking.

A voice output section 24 supplies voice signals (e.g., the guidance information for navigation, and the information on the processes of obtaining and displaying the current POI information) to the speaker 7 based on the control of the controller 17. An identified POI storage section 25 is also provided for performing the following function. In cases where POI information set by the user through the operating section 2 (the remote control transmitter 30 of FIG. 2) has been displayed or has remained being set on the map screen of the display unit 6 for a predetermined interval (for example, more than one week), the controller 17 identifies the displayed POI information as "POI information corresponding to user preference", and then the identified POI storage section 25 stores this identified POI information therein, as explained in detail later. In storing this identified POI information, the POI information is given corresponding updating-time information (for example, information indicating the time of reception of the identified POI information at the map information transmission center 60 end) based on the communication with the map information transmission center 60, then to be stored in the storage section 25, as described below.

In the vehicle navigation device 50 of the preferred embodiment, the operating section 2 corresponds to "information input means"; the communications unit 3 to "communications means"; the controller 17 to "control means"; the landmark drawing section 22 to "POI drawing means"; and the identified POI storage section 25 to "identified POI storage means", respectively.

Figure 3:
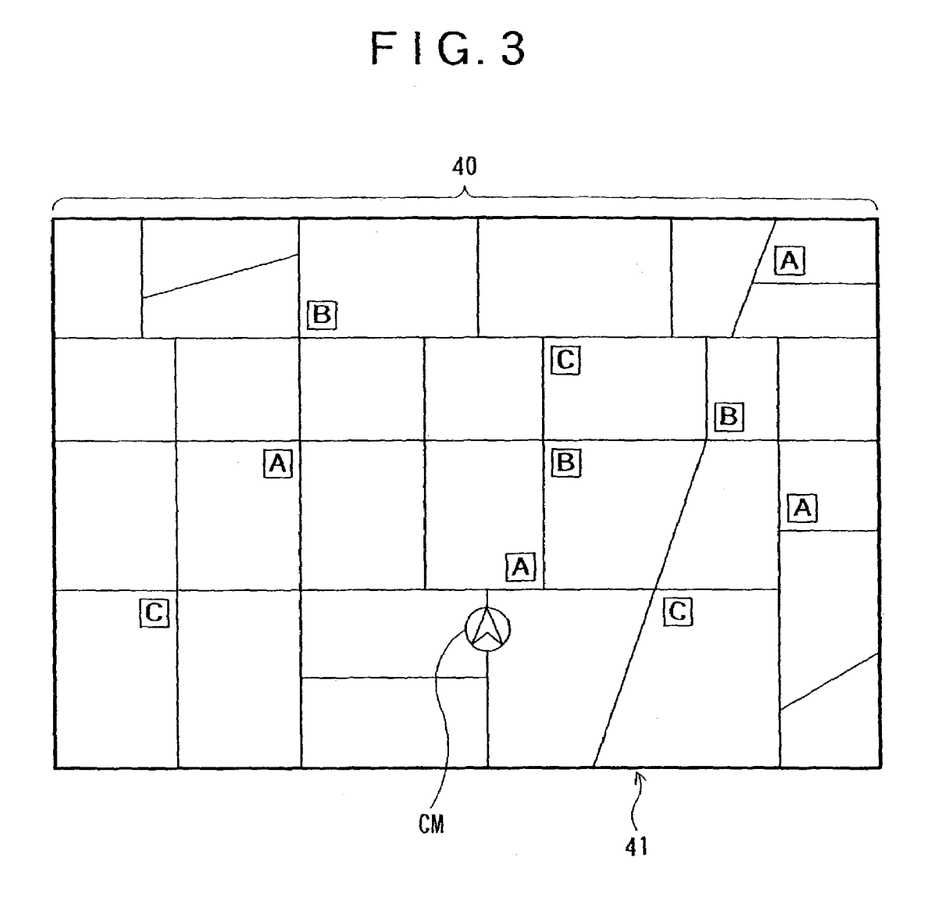
FIG. 3 shows a first exemplary display screen on which POI information is displayed.
Figure 4:
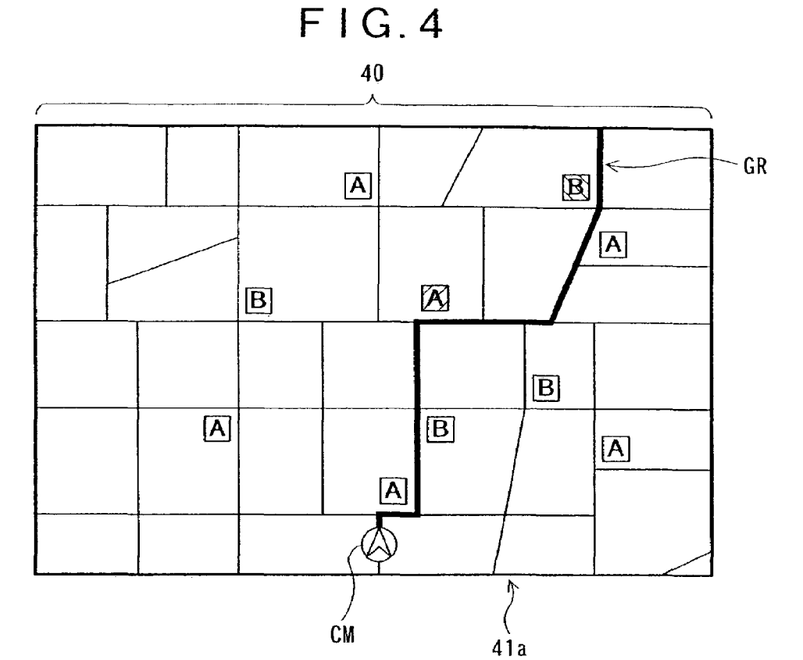
FIG. 4 shows a second exemplary display screen on which other POI information is displayed.
Figure 5:
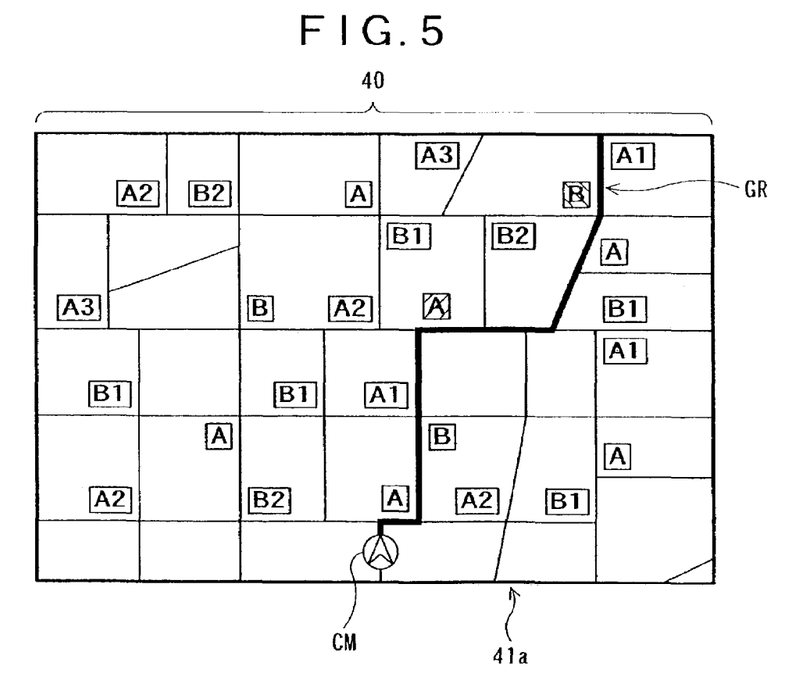
FIG. 5 shows a third exemplary display screen on which other POI information is displayed.

FIGS. 3 to 5 show exemplary display screens on which the POI information is displayed by the vehicle navigation device 50 according to the preferred embodiments.

FIG. 3 shows an example in which the navigation device 50 displays POI information (landmarks designated as A, B and C each enclosed in a square) for designating locations of points of interest (convenience stores, fast food restaurants, gas stations, and the like) which have been selectively set by the user's operation of the operating section 2 (the remote control transmitter 30 of FIG. 2), together with a vehicle position mark CM on a map image 41 displayed on a display screen 40 of the display unit 6.

FIG. 4 shows an example in which the navigation device 50 displays the current POI information (landmarks designated as A and B each enclosed in a square) obtained from the map information transmission center 60 through the communications unit 3 under the control of the controller 17, together with a guidance route GR automatically searched for by the controller 17 based on a destination set by the user on a map image 41a displayed on the display screen 40 of the display unit 6.

In the exemplary display screen of FIG. 4, updated portions (for convenience, the landmarks A and B as indicated by the hatch pattern in this figure) of the current POI information obtained from the map information transmission center 60 are displayed in a relatively highlighted or distinguishable form (e.g., in different color) from the others. This enables the user to identify the newest or updated portions among the POI information displayed on the screen 40.

It is noted that the current POI information obtained from the map information transmission center 60 corresponds to the contents of the POI information (in this case of FIG. 4, the landmarks A and B) which is among the original POI information (the landmarks A, B and C in the exemplary display screen of FIG. 3) first set by the user, and which has been displayed during the predetermined interval on the display screen 40, to be identified as the "POI information corresponding to user preference" by the controller 17. Therefore, the exemplary display screen as shown in FIG. 4 does not display the POI information (the landmark C) which is already cancelled by resetting after being initially set and being displayed on the screen 40.

Note that since a reduced scale for display is normally adjusted so that the user can understand the guidance route GR with ease, no icon for designating the set destination is displayed on the screen 40 in the display screen example of FIG. 4.

FIG. 5 shows one example of the newest POI information (landmarks A1, A2, A3, B1 and B2) about other points, in addition to the display contents (the landmarks A and B) on the screen as exemplarily illustrated in FIG. 4. For example, suppose that the landmarks A and B correspond to "convenience stores", the landmarks A1, A2, A3, B1 and B2 additionally displayed correspond to a "supermarket", a "discount store", a "rental shop", and the like.

Now, the operation of the vehicle navigation device 50 of the preferred embodiment when performing the processes of obtaining and displaying the current POI information will be described in detail with reference to FIG. 6, which shows exemplary flowcharts of the processes.

Figure 6A:
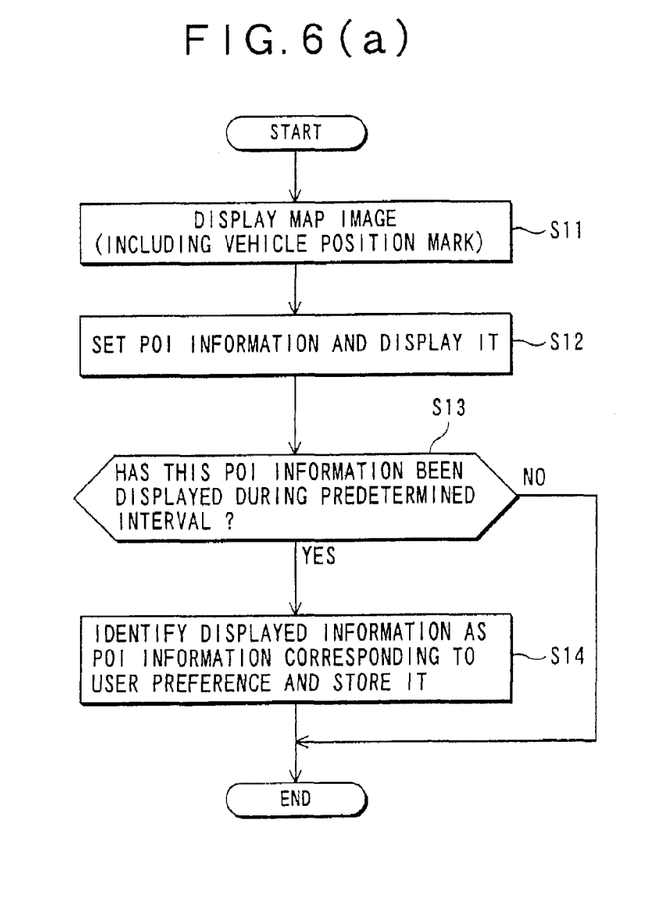
FIG. 6 is an exemplary flowchart showing processes of obtaining and displaying the current POI information, which are carried out by the vehicle navigation device of FIG. 1.

First, referring to FIG. 6(*a*), in a first step S11, the map image 41 is displayed on the display screen 40 of the display unit 6 under control of the controller 17 with the vehicle position mark CM superimposed thereon, as illustrated in the exemplary display screen of FIG. 3.

More specifically, the controller 17 first receives a GPS signal supplied from the GPS receiver 4 through the interface 15, and a signal supplied from the self-contained sensor 5 through the interface 16, and detects a present vehicle position based on these signals. The controller 17 then reads out map data covering the detected present vehicle position and its surroundings from the CD-ROM 1*a* by controlling the map data readout controller 11 to transmit and store this read map data into the buffer memory 12. Next, the map drawing section 18 generates a map image based on the map data read by the buffer memory 12 under the control of the controller 17, to display the map image 41 covering the surroundings of the vehicle position through the image synthesizer 23 on the display screen 40 of the display unit 6. Further, the controller 17 constantly keeps detecting the present vehicle position responsive to the signals supplied from the GPS receiver 4 and the self-contained navigation sensor 5 as the vehicle travels, and superimposes the vehicle position mark CM on the map image 41 displayed on the display screen 40 of the display unit 6, based on the detection result through the operating screen and mark generator 19 and the image synthesizer 23. As needed, the controller 17 makes the vehicle position mark CM move, or the map image 41 scrolled according to the vehicle travel.

In the next step S12, as illustrated in the exemplary display screen of FIG. 3, the POI information (the landmarks A, B and C) selectably set by the user is displayed on the map image 41, which is displayed on the display screen 40 of the display unit 6, through the landmark drawing section 22 and the image synthesizer 23 under the control of the controller 17. It should be noted that although the landmarks A, B and C are all displayed on the exemplary display screen of FIG. 3, the landmark C is to be cancelled by the user's resetting before the predetermined interval passes after it is displayed.

In the next step S13, the controller 17 determines whether or not the POI information set in the previous step S12 has been displayed (that is, has remained being set) during the predetermined interval (for example, more than one week) on the map image 41, which is displayed on the display screen 40 of the display unit 6. If yes, the operation proceeds to step S14. If no, then this processing flowchart ends.

In the next step S14, the controller 17 identifies the POI information displayed during the predetermined interval (in this example, the landmarks A and B) as the "POI information corresponding to user preference", and then stores the identified POI information in the identified POI storage section 25. In this storage, the identified POI information is provided with the corresponding updating-time information given from the map information transmission center 60 based on the communication with the center 60 through the communications unit 3 under the control of the controller 17, and stored in the storage section 25. Then, this processing flowchart ends.

Figure 6B:
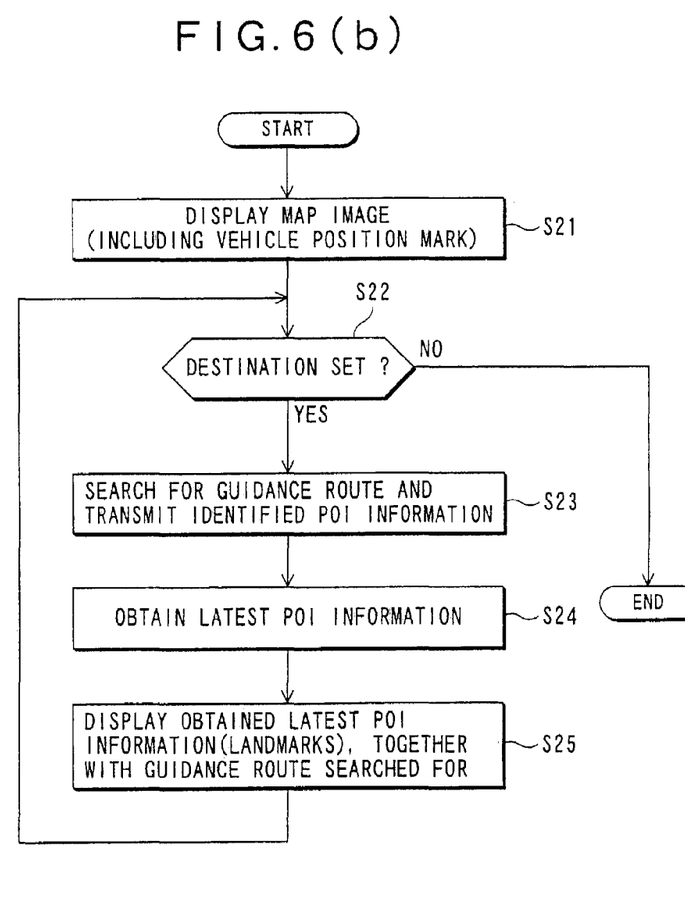

Next, referring to FIG. 6(*b*), in the first step S21, the same processing as that in the step S11 of FIG. 6(*a*) is executed. That is, the map image 41 is displayed on the display screen 40 of the display unit 6 under the control of the controller 17, while the vehicle position mark CM is superimposed on the map image 41.

In the next step S22, the controller 17 determines whether or not the user has operated the operating section 2 (remote control transmitter 30) to set (reset) the destination. In other words, it determines whether the setting (resetting) of a guidance route has been performed or not. If yes, the operation proceeds to step S23. If no, then this processing flowchart ends.

In the next step S23, the controller 17 automatically searches for the guidance route based on the destination set (reset) by the user, while transmitting to the map information transmission center 60 the identified POI information stored in the identified POI storage section 25 as the "POI information corresponding to user preference" (with the updating-time information for specifying the identified POI information added thereto) through the communications unit 3.

More specifically, according to data on the destination entered, and data on the starting point which is set to be the present vehicle position detected based on the output signals from the GPS receiver 4 and the self-contained navigation sensor 5, the controller 17 reads map data covering an area from the starting point to the destination and road data for the route search, from the CD-ROM 1*a* into the buffer memory 12 by controlling the map data readout controller 11. Then, referring to data stored in the guidance route storage section 20, the controller 17 performs the route search for the shortest guidance route connecting the starting point to the destination by means of the horizontal search method.

Further, the controller 17 transmits the identified POI information (including its updating-time information) stored in the identified POI storage section 25 to the map information transmission center 60, and accesses the map information transmission center 60 to confirm whether the identified POI information has been updated or not. That is, by referring to the updating-time information given to the received identified POI information, the map information transmission center 60 detects whether or not the identified POI information has been updated. If the identified POI information has been updated, the center 60 transmits the current or newest POI information corresponding to this identified POI information. If not, the center 60 gives the controller 17 a notice that the identified POI information has not been updated. The vehicle navigation device 50 receives the current POI information or the above notice transmitted from the map information transmission center 60, to verify it against the identified POI information stored in the identified POI storage section 25, thereby confirming whether or not the identified POI information transmitted from the controller 17 to the center 60 has been updated.

In the next step S24, irrespective of whether the current POI information corresponding to the identified POI information transmitted to the center 60 has been updated or not, the navigation device 50 receives and obtains this current POI information corresponding to the identified POI information and included in the map information about the predetermined area covering the vehicle position, from the map information stored at the map information transmission center 60 in a database, through the communications unit 3 under the control of the controller 17.

In the next step S25, the current POI information obtained through the communications unit 3 (the landmarks A and B on the exemplary display screen of FIG. 4) is displayed together with the found guidance route GR on the map image 41a, which is displayed on the display screen 40 of the display unit 6, through the image synthesizer 23 under the control of the controller 17.

At this time, in cases where there exists an updated portion of the current POI information obtained through the communications unit 3, the updated POI information part is displayed in a different form from the other information not updated. In the example of the display screen of FIG. 4, the updated POI information portions (for convenience, in FIG. 4 the landmarks A and B as indicated by the hatch pattern) are displayed in a distinguishable "different color" so that the user can identify them with ease.

If necessary, the speaker 7 may simultaneously provide a notice that the identified POI information has been updated through the voice output section 24 under the control of the controller 17. Thereafter the operation returns to step S22 to repeat the aforesaid processing.

As described above, according to the vehicle navigation device 50 of the preferred embodiment, in cases where the POI information first preset by the user has been displayed on the display screen 40 (map image 41) of the display unit 6 during a predetermined interval (that is, in cases where the POI information is identified as the "POI information corresponding to user preference"), when the guidance route or destination is set, the navigation device accesses the map information transmission center 60 to obtain the current POI information corresponding to the identified POI information and included in the map information about the predetermined area covering the vehicle position, from the map information, so that the current POI information obtained is displayed together with the guidance route GR and the vehicle position mark CM on the screen 40 of the display unit 6 (as shown in the exemplary display screen of FIG. 4).

This control of display allows the user to recognize the latest or updated POI information (landmarks A and B) for the points of interest existing near the guidance route GR to the destination, and thereby to confirm or identify the guidance route GR to the destination with the current POI information as landmarks. At this time, if the POI information is displayed on the map screen in a relatively distinguishable form as shown in the exemplary display screen of FIG. 4 (the landmarks A and B are indicated by the hatch pattern), the user can understand that the POI information distinguishably displayed is new information not included in the user's database (CD-ROM 1a). This permits the confirmation of the guidance route GR to the destination with more ease (the improvement of visibility).

Further, if necessary, the speaker 7 may provide a notice that the POI information has been updated through the voice output section 24 under the control of the controller 17, thus enabling the user (in particular, the driver) to understand by voice that updated information is included in the obtained POI information. The user, therefore, does not need to fix his/her eyes on the screen of the display unit 6 and can concentrate on driving.

In the above-mentioned embodiments, the current POI information which corresponds to the information identified as the "POI information corresponding to user preference", and which is included in the map information about the predetermined area covering the vehicle position is obtained from the map information transmission center 60 by the controller 17, as explained in the above examples. In another case, as explained with reference to the exemplary display screen of FIG. 5, the current POI information on other points of interest (for example, the landmarks A1, A2, A3, B1 and B2) may be obtained altogether.

As can be seen from the aforesaid description, according to the present invention, with the guidance route set, the navigation device accesses a provider offering the transmission service of the map information including the current POI information about the places where points of interest are located, to obtain the current POI information included in the map information on a predetermined area covering the vehicle position. Thus, the current POI information can constantly be displayed on the screen of the display unit that pertains to the points of interest serving as landmarks near the guidance route to the destination. This permits the current POI information to function as landmarks while the guidance route is being shown on the screen of the display unit, thus enabling the user to confirm the guidance route with ease.

What is claimed is:

1. An in-vehicle navigation device that is adapted to be connected in communication with a remote provider offering transmission service of current POI (Point of Interest) information comprising landmarks that designate the locations on a map where points of interest are located, the in-vehicle navigation device comprising:

a display unit for providing guidance information to a user;

an information input section for entering information to set a destination;

a communications section for communicating with said remote provider; and a controller operably connected to said display unit, said information input section, and said communications section;

wherein, when a destination is set through said information input section, said controller searches for a guidance route to the destination and accesses the remote provider through the communications section to obtain current POI information included in a predetermined area covering a present position of a vehicle, and then said controller displays said obtained current POI information as landmarks designating POI locations together with said guidance route and a vehicle position mark designating the present vehicle position on a map image on a screen of the display unit, so that the user can recognize landmarks along the actual guidance route during travel; and wherein, in a case where POI information set by the user through said information input section has remained set for a predetermined interval, said controller identifies said set POI information as POI information corresponding to user preference, and then transmits said identified POI information to the remote provider when said guidance route is searched, thereby to obtain the current POI information corresponding to said identified POI information from the remote provider.

2. The vehicle navigation device according to claim 1, wherein, when the controller displays the obtained current POI information together with the guidance route and the vehicle position mark on the screen of the display unit, said controller displays an updated portion of said current POI information in a different form from the other portions not updated.

3. The vehicle navigation device according to claim 1, further comprising an identified POI storage section for storing the POI information identified as that corresponding to the user preference by said controller.

4. The vehicle navigation device according to claim 3, wherein the identified POI information stored in said identified POI storage section includes updating-time information which is assigned to the corresponding identified POI information based on the communication between the controller and the remote provider.

5. The vehicle navigation device according to claim 1, further comprising a POI drawing section for performing drawing processing of the current POI information obtained from said remote provider through the communications section under control of the controller.

6. The vehicle navigation device according to claim 1, further comprising a speaker for providing a notice that, if the current POI information displayed on the screen of the display unit by the controller includes an updated POI information portion, said POI information has been updated.

7. An in-vehicle navigation device that is adapted to be connected in communication with a remote provider offering transmission service of current POI (Point of Interest) information comprising landmarks that designate the locations on a map where points of interest are located, the in-vehicle navigation device comprising:

a display unit for providing guidance information to a user;

an information input section for entering information to set a destination;

a communications section for communicating with said remote provider; and a controller operably connected to said display unit, said information input section, and said communications section;

wherein, when a destination is set through said information input section, said controller searches for a guidance route to the destination and accesses the remote provider through the communications section to obtain the current POI information included in a predetermined area covering a present position of a vehicle;

wherein, when displaying said obtained current POI information as landmarks designating POI locations together with said guidance route and a vehicle position mark designating the present vehicle position on a map image on a screen of the display unit so that the user can recognize landmarks along the actual guidance route during travel, said controller displays an updated portion of said current POI information in a different form from the other portions not updated; and wherein, in a case where POI information has been set by the user through said information input section, said controller identifies said set POI information as POI information corresponding to user preference, and then transmits said identified POI information to the remote provider when said guidance route is searched, thereby to obtain the current POI information corresponding to said identified POI information from the remote provider.

8. The vehicle navigation device according to claim 7, further comprising an identified POI storage section for storing the POI information identified as that corresponding to the user preference by said controller.

9. The vehicle navigation device according to claim 8, wherein the identified POI information stored in said identified POI storage section includes updating-time information which is assigned to the corresponding identified POI information based on the communication between the controller and the remote provider.

10. The vehicle navigation device according to claim 7, further comprising a POI drawing section for performing drawing processing of the current POI information obtained from said remote provider through the communications section under control of the controller.

11. The vehicle navigation device according to claim 7, further comprising a speaker for providing notice that, if the current POI information displayed on the screen of the display unit by the controller includes the updated POI information portion, said POI information has been updated.

12. A method of displaying POI (Point of Interest) information in an in-vehicle navigation device that is adapted to be connected in communication with a remote provider offering transmission service of current POI information comprising landmarks that designate the locations on a map where points of interest are located, the method comprising:

accessing said remote provider when a guidance route to a destination is searched by the in-vehicle navigation device;

obtaining from the remote provider current POI information included in a predetermined area covering a present position of a vehicle; and displaying to a user said obtained current POI information as landmarks designating POI locations together with said guidance route and a vehicle position mark designating the present vehicle position on a map image on a screen of the navigation device, so that the user can recognize landmarks along the actual guidance route during travel;

wherein, in a case where POI information set by a user has remained set for a predetermined interval, identifying said set POI information as POI information corresponding to user preference, and transmitting the identified POI information to the remote provider when the guidance route is searched, thereby to obtain the current POI information corresponding to the identified POI information from the remote provider.

13. The method of displaying POI information according to claim 12, further comprising displaying an updated portion of said current POI information in a different form from the other portions not updated when said obtained current POI information is displayed together with said guidance route and said vehicle position mark.

14. The method of displaying POI information according to claim 12, further comprising storing the POI information identified as that corresponding to the user preference.

15. The method of displaying POI information according to claim 14, wherein the stored identified POI information includes updating-time information which is assigned to the corresponding identified POI information based on the communication with the remote provider.

16. The method of displaying POI information according to claim 12, further comprising performing drawing processing of the current POI information obtained from said remote provider.

17. The method of displaying POI information according to claim 12, further comprising providing a notice by a speaker that, if the current POI information displayed to the user includes an updated POI information portion, said POI information has been updated.

* * * * *